United States Patent
Kinder

(12) 
(10) Patent No.: US 6,293,596 B1
(45) Date of Patent: Sep. 25, 2001

(54) QUICK CONNECTOR WITH AFTER INCIDENT INDICATOR CLIP

(75) Inventor: Dennis G. Kinder, Oxford, MI (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/226,768

(22) Filed: Jan. 6, 1999

(51) Int. Cl.[7] .................................................. F16L 37/00
(52) U.S. Cl. .............................. 285/305; 285/81; 285/82
(58) Field of Search .................... 285/23, 81, 82, 285/305, 148.13

(56) References Cited

U.S. PATENT DOCUMENTS

| | | | |
|---|---|---|---|
| Re. 36,771 | * | 7/2000 | Carlson ................................ 285/305 |
| 154,536 | * | 8/1874 | Wolf ................................ 285/305 X |
| 1,809,237 | * | 6/1931 | Halborg ........................... 285/305 X |
| 2,021,241 | | 11/1935 | Mall ..................................... 285/161 |
| 2,305,809 | * | 12/1942 | Maisch .............................. 285/81 X |
| 3,224,800 | * | 12/1965 | Fisher ................................ 285/82 X |
| 3,245,702 | | 4/1966 | Smith ..................................... 285/305 |
| 3,698,747 | * | 10/1972 | Wing et al. ........................... 285/305 |
| 3,942,570 | * | 3/1976 | Bochman, Jr. et al. ............ 285/81 X |
| 4,126,335 | * | 11/1978 | Voss ................................ 285/81 X |
| 4,423,892 | | 1/1984 | Bartholomew ....................... 285/319 |
| 4,431,218 | | 2/1984 | Paul, Jr. et al. ..................... 285/305 |
| 4,433,861 | | 2/1984 | Kreczik ................................ 285/305 |
| 4,524,995 | | 6/1985 | Bartholomew ......................... 285/54 |
| 4,526,411 | | 7/1985 | Bartholomew ....................... 285/305 |
| 4,558,842 | * | 12/1985 | Peil et al. ........................ 285/305 X |
| 4,561,682 | | 12/1985 | Tisserat ................................ 285/305 |
| 4,591,192 | | 5/1986 | Van Exel et al. ....................... 285/83 |
| 4,635,966 | * | 1/1987 | Hermann .......................... 285/23 X |
| 4,697,608 | * | 10/1987 | Kolze et al. ........................ 285/82 X |
| 4,869,534 | | 9/1989 | Ketcham et al. ........................ 285/32 |
| 4,874,174 | | 10/1989 | Kojima et al. ........................... 285/32 |
| 4,925,217 | | 5/1990 | Ketcham .................................. 285/93 |
| 4,936,544 | | 6/1990 | Bartholomew .................... 251/149.6 |
| 4,946,205 | | 8/1990 | Washizu ................................ 285/319 |
| 4,948,175 | | 8/1990 | Bartholomew ......................... 285/39 |
| 5,016,922 | | 5/1991 | Le Mer et al. .......................... 285/81 |
| 5,092,300 | * | 3/1992 | Imoehl et al. .................... 285/305 X |
| 5,102,313 | | 4/1992 | Szabo ..................................... 417/572 |
| 5,152,555 | | 10/1992 | Szabo ..................................... 285/93 |
| 5,178,424 | | 1/1993 | Klinger ................................ 285/319 |
| 5,213,376 | | 5/1993 | Szabo ..................................... 285/39 |
| 5,226,679 | | 7/1993 | Klinger ................................ 285/93 |
| 5,275,443 | | 1/1994 | Klinger ................................ 285/82 |
| 5,297,818 | | 3/1994 | Klinger ................................ 285/93 |
| 5,348,353 | | 9/1994 | Deweerdt ............................ 285/305 |
| 5,366,259 | * | 11/1994 | Hohmann et al. ................... 285/305 |
| 5,401,063 | | 3/1995 | Plosz ..................................... 285/81 |
| 5,405,175 | | 4/1995 | Bonnah, II et al. ................. 285/305 |
| 5,423,577 | | 6/1995 | Ketcham ............................. 285/305 |
| 5,433,183 | * | 7/1995 | Vansnick ........................ 285/305 X |
| 5,452,924 | | 9/1995 | Kujawski ............................. 285/305 |
| 5,542,716 | | 8/1996 | Szabo et al. ......................... 285/305 |
| 5,586,792 | | 12/1996 | Kalahasthy et al. ................. 285/319 |

(List continued on next page.)

FOREIGN PATENT DOCUMENTS

| | | | |
|---|---|---|---|
| 163947 | * | 9/1949 | (AT) ..................................... 285/305 |
| 3033760 | * | 3/1982 | (DE) ..................................... 285/305 |
| 1396434 | * | 3/1965 | (FR) ..................................... 285/305 |
| 278095 | * | 11/1990 | (JP) ..................................... 285/305 |
| WO93/15349 | | 8/1993 | (WO) . |

*Primary Examiner*—Lloyd A. Gall
(74) *Attorney, Agent, or Firm*—Robert P. Seitter

(57) ABSTRACT

A temperature resistant after incident clip is engageable with a retainer and mountable along with the retainer over a male component only when the male component is fully inserted into a bore in a female component. The clip is the form of a one-piece metal body having first and second spaced legs interconnected by an end wall and mountable about the male component. First and second arms project from the end wall and are engageable with a post on a retainer and lockingly mount the after incident clip on the retainer.

21 Claims, 2 Drawing Sheets

U.S. PATENT DOCUMENTS

| | | | |
|---|---|---|---|
| 5,653,475 | * | 8/1997 | Scheyhing et al. ............... 285/305 X |
| 5,683,117 | | 11/1997 | Corbett et al. .......................... 285/24 |
| 5,730,481 | | 3/1998 | Szabo et al. ......................... 285/305 |
| 5,782,502 | | 7/1998 | Lewis ..................................... 285/87 |
| 5,794,984 | * | 8/1998 | Bartholomew ................... 285/305 X |
| 5,799,986 | | 9/1998 | Corbett et al. .......................... 285/55 |
| 5,853,204 | * | 12/1998 | Bartholomew ....................... 285/305 |
| 5,931,509 | * | 8/1999 | Bartholomew ..................... 285/81 X |
| 6,027,143 | * | 2/2000 | Berg et al. ....................... 285/305 X |

* cited by examiner

QUICK CONNECTOR WITH AFTER INCIDENT INDICATOR CLIP

BACKGROUND OF THE INVENTION

1. Field of the Invention

The present invention relates, in general, to quick connectors and, more specifically, to quick connectors including an internal retainer and means providing an indication of complete coupling between the male and female elements of the quick connector.

2. Description of the Art

Snap-fit or quick connectors are employed in a wide range of applications, particularly, for joining fluid carrying conduits in automotive and industrial application. In a typical quick connector, a retainer is fixedly mounted within a bore in a housing of a female connector component or element. The retainer has a plurality of radially extending legs which extend inwardly toward the axial center line of the bore in the housing. A tube or fitting to be sealingly mounted in the bore in the female component includes a radially upset portion or flange which abuts an inner peripheral surface of the retainer legs. Seal and spacer members as well as a bearing or top head are typically mounted in the bore ahead of the retainer to form a seal between the housing and the male fitting when the male fitting is lockingly engaged with the retainer legs.

While such a retainer is usually effective in releasably coupling the male and female elements of a quick connector, it is possible that the male fitting may be partially, but not fully seated or coupled to the internal seal elements in the bore of the female component and not fully locked in position by the retainer legs. In this partially engaged position, the male fitting may work itself free of the housing thereby leading to leaks in the fluid delivery system.

As it is desirable to ensure that the male and female elements are fully coupled to prevent leaks, various indicators have been provided to indicate a full coupling or seating of the male fitting in the female element. In one type of indicator shown in U.S. Pat. No. 4,925,217, a deformable member is assembled within the fitting which includes elongated members extending out of the housing between the male and female elements prior to coupling and which are retracted, and no longer visible, once the coupling has been fully accomplished. The annular member in this device remains in assembly with the quick connector and contributes to component count, tolerance stack-up and possible misassembly. Furthermore, the elongated members which are visible during non-coupling of the connector are, by design, not visible after coupling is fully effected. In many applications, such as an extremely crowded engine compartment of a motor vehicle, the installed coupling may be difficult to see and inspect closely. Thus, the inability to see the elongated members from a distance or from an awkward position will not result in a high degree of confidence that the coupling has in fact fully taken place.

Other types of visual indicators, as shown in U.S. Pat. No. 4,946,205, are removable after full coupling of the male and female quick connector elements. However, the indicator disclosed in this patent is complex and adds considerable axial length to the quick connector.

To overcome these problems and to provide an advancement in the quick connector art, the quick connect insertion indicator clip disclosed in U.S. Pat. No. 5,152,555, and assigned to the assignee of the present invention, was devised. This indicator clip includes a flag portion positioned externally of the quick connector and has members extending from the flag portion to embrace the female element of the quick connector. Engagement tabs extending from the members through registering apertures in the female element will contact an abutment surface formed on the male element upon fully coupling of the male and female components to enable removal of the indicator device as verification of complete or full coupling. When coupling is incomplete or not fully effected, the indicator device cannot be removed from the female component.

While the insertion indicator clip disclosed in U.S. Pat. No. 5,152,555 provides an easily visible indication of complete coupling of quick connector components, the quick connector still requires a separate retainer to lockingly couple the male and female components together.

U.S. Pat. No. 5,102,313 discloses a retainer clip having a centrally located slot for envelopingly engaging the radial flange on a male conduit when the male conduit is fully inserted into the female portion of a coupler. However, in this arrangement, if the clip is inserted into the housing axially ahead of the radial flange on the male conduit, the length of the male conduit between the flange and the forward tip end of the male conduit is sufficient to at least partially engage a seal mounted in the female housing. This could cause a subsequent leak since the male conduit, while appearing to be fully inserted into the female housing, is only partially engaged with the seal and, further, is not locked in a fixed portion in the female housing by the retainer clip.

To address these problems, a quick connector with a snap-on retainer disclosed in U.S. Pat. No. 5,542,716 was developed. This retainer is releasably insertable into a transverse bore formed in female housing and includes an internal recess engageable with the radial flange on the male component only when the male component is fully coupled in an axial bore in the female component. The engagement between the recess and the radial flange permits full insertion of the retainer into the transverse bore and locks the male component and the female component together. The female component has opposed interior surfaces spaced sufficiently apart to permit the deflectable legs on the retainer to flex apart while they are being slidingly urged over the male component and to snap over the male component in the locked position. The opposed surfaces block full insertion of the retainer into the female component when the male component is not fully seated in the component. Lock projections on the retainer releasably lock the retainer in a partially inserted, shipping position in the transverse bore in the female component. This quick connector meets the required functions of providing a visual indication of a sealed and locked connection between the male and female components, providing an "avalanche effect" retainer clip, is releasible without special tools, and insures that the male component be fully inserted into the female component before the retainer can be urged into the latched position.

While the above-described quick connectors with indicators provide a visual indication of a sealed and locked connection between the male and female components, the indicator clips are typically formed of plastic. A thermal incident, such as fire caused by a vehicle crash or the combustion of fluid leaking from the quick connector or associated fluid conduits, can completely destroy the quick connector and the visual indicator. This leaves no visible evidence that the quick connector was properly locked prior to or after the event leading to the thermal incident. Such information is valuable in terms of determining the long term, crash resistant reliability of the quick connector.

Thus, it would be desirable to provide a quick connector with means which provides a visual indication of the locked connection between the male and female components of the quick connector despite any thermal incident which may damage or destroy the other portions of the quick connector. It would also be desirable to provide a quick connector with an after incident clip in which the clip can be integrated into the quick connector without requiring substantial modifications to the design and construction of the quick connector itself. It would also be desirable to provide a quick connector with an after incident clip in which the after incident clip does not interfere with the low insertion force and high pullout force characteristics of the quick connector.

SUMMARY OF THE INVENTION

The present invention is a quick connector with means which provides a visual indication of the fully locked connection of the quick connector despite any thermal incident which may have destroyed some or all of the quick connector itself.

The quick connector in an exemplary construction includes mating male and female components. The female component is formed of a housing having an axially extending bore terminating at an open end of the housing for receiving the male component therein. A transverse bore formed by opposed apertures extends through the housing in communication with the axially extending bore. The male component has a radially enlarged portion spaced from one end. A retainer means is completely slidable through the transverse bore in the housing only when the male component is fully coupled to the female component for releasably locking the male and female components together.

The retainer means includes a body having an end wall and first and second spaced legs extending from the end wall. Means are formed on the body for releasably locking the body in a partially inserted position in the transverse bore in the housing.

The after incident clip is formed of a body constructed from a high temperature resistant material. Means are provided on a body for mounting the body about the male component. Means are also carried on the body for releasably engaging the retainer. The body is preferably formed of a high temperature resistant material, such as metal and, more particularly, steel.

The means for mounting the body about the male component comprises first and second spaced legs which are interconnected at one end by an end wall. The first and second legs are spaced at a distance at least as large as the diameter of the male component. The means for releasably engaging the retainer comprises a pair of spaced arms extending cantileveredly from the body and having opposed, freely movable ends. The ends are preferably bent inward and spaced from the inward extending end of the opposite arm. The inward extending ends of the arms are expandable when the after incident clip is inserted into the retainer and snap past a central post in an aperture in the retainer to lockingly engage the after incident clip with the retainer.

Preferably, the first and second arms, the end wall and the first and second legs are unitarily formed of a one-piece member.

Further, an inward extending indent is formed in at least one and, preferably, both of the first and second arms. The indents are spaced between the inward extending bent ends of the arms and the means for mounting the body on the male component. The indents engage the central post on the retainer to lockingly mount the after incident clip to the retainer.

The present invention provide several advantages over previously devised retainers and quick connectors with insertion indicators. The retainer serves the multiple functions of lockingly engaging the male and female components of the quick connector, and providing a visual indication of complete and locked coupling of the male and female components. Further, the present retainer may be mounted in a partially inserted position on the female component of the quick connector for shipment and for ease of use after the male component has been inserted into the female component.

The after incident clip is designed to remain situated about the male component even after a thermal incident may have destroyed some or all of the remaining portions of the quick connector which is typically formed of plastic. In this manner, even after a thermal incident, the after incident clip provides a visual indication of the fully locked condition of the quick connector prior to the thermal incident.

The after incident clip is simply constructed and is easily integrated into existing quick connector designs without requiring significant modifications to such quick connector designs. The after incident clip also is mountable in a quick connector without interfering or changing the insertion and pullout force properties of the quick connector itself.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENT

Figure 1:
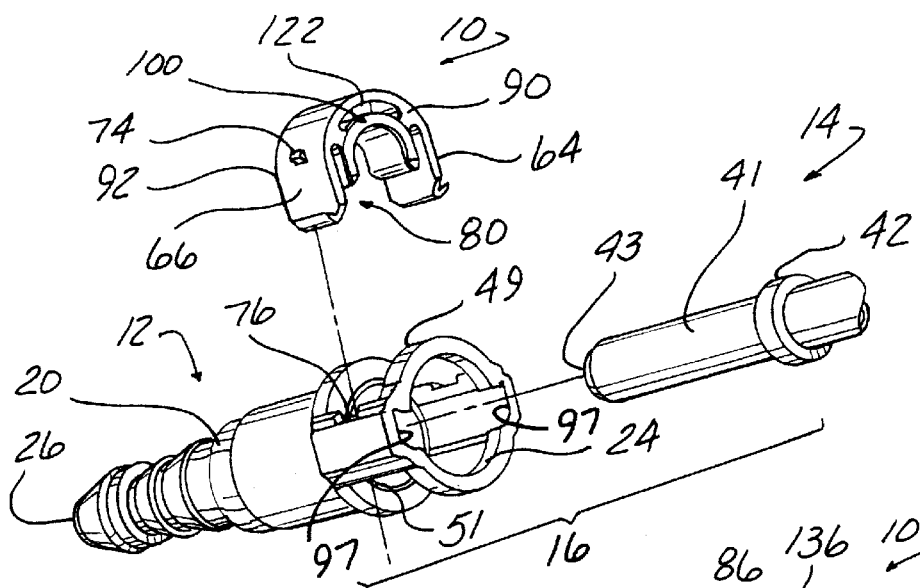
FIG. 1 is an exploded, perspective view of a quick connector with a snap-on retainer on which the after incident indicator clip of the present invention is mounted.

Referring now to FIGS. 1–7, there is depicted a snap-on retainer 10 which lockingly couples female and male components 12 and 14, respectively, of a quick connector 16.

The following description of the female connector component or element 12 is by way of example only as the female connector component 12 may have any suitable shape typically found in quick connectors.

Figure 5:
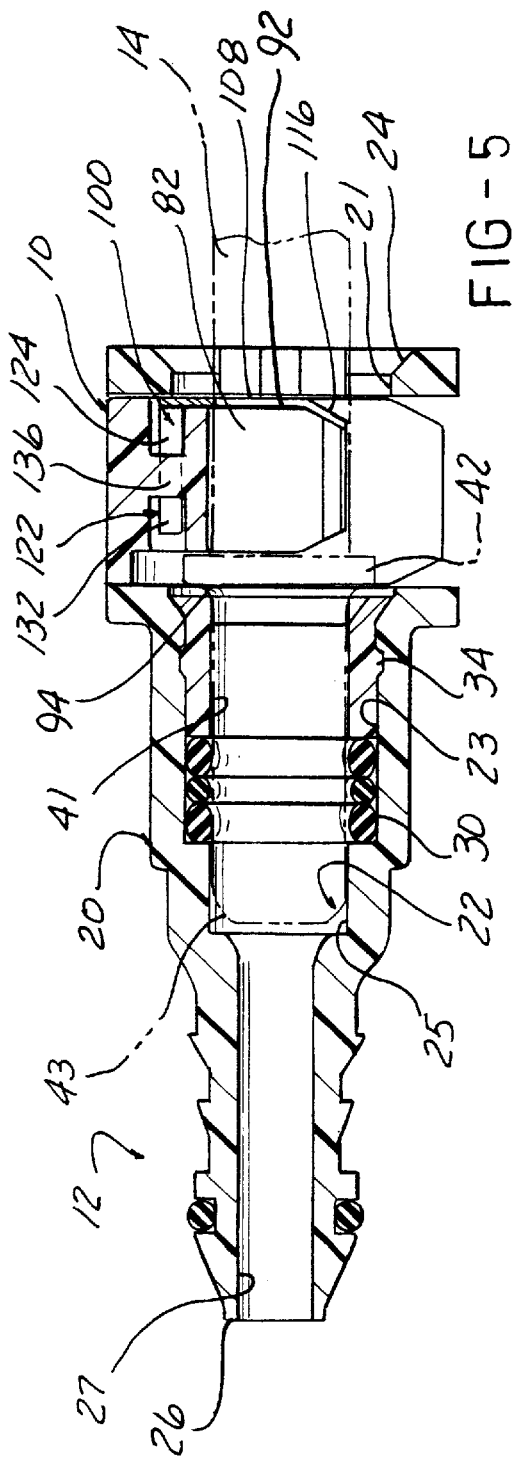
FIG. 5 is a cross sectional view generally taken along line 5—5 in FIG. 4.

The female component includes a housing 20 having an elongated, axially extending, internal stepped bore 22 extending from a large diameter first, open end 24 to a smaller diameter, second open end 26, as shown in detail in FIG. 5. The stepped bore 22 includes a first bore portion 21 extending from an opening at the first end 24 of the housing 20 to a second smaller diameter second stepped bore portion 23. A third yet smaller diameter stepped bore portion 25 extends axially from one end of the second stepped bore portion 23 and communicates to a still smaller fourth stepped bore portion 27 which extends to the open second end 26 of the housing 20.

As is conventional, a top hat or bearing 34 is mounted in the second stepped bore portion 23 immediately adjacent the end of the first bore portion 21. A seal means 30 is also mounted in the second stepped bore portion 23 between one end of the top hat 34 and the third stepped bore portion 25.

The inner diameter of the first stepped bore portion 21 is sized to slidably receive the outer diameter of the radially enlarged flange or upset bead 42 formed on the male component or fitting 14. Further, the inner diameters of the seal means 30 and the top hat 34 are sized to sealingly engage the outer diameter of the end portion 41 of the male component 14 extending from the radially enlarged flange 42 to the tip end 43 of the male component 14. The third stepped bore portion 25 has an inner diameter sized to snugly engage the outer diameter of the end portion 41 of the male component 14 when the male component 14 is fully inserted into the stepped bore 22 as described hereafter.

Figure 3:
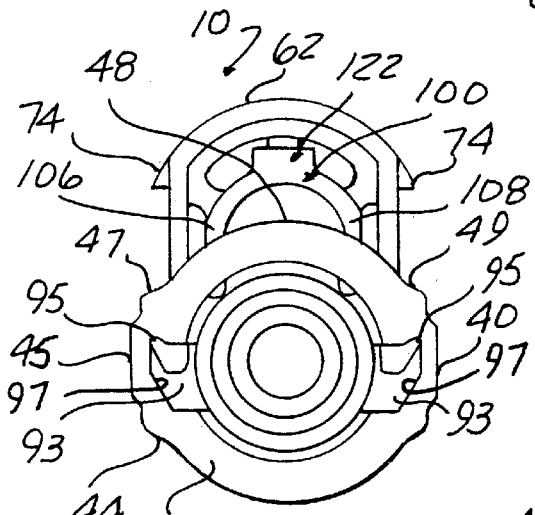
FIG. 3 is an end view of the quick connector, snap-on retainer and after incident indicator clip, with the retainer shown in a partially inserted, storage position.
Figure 4:
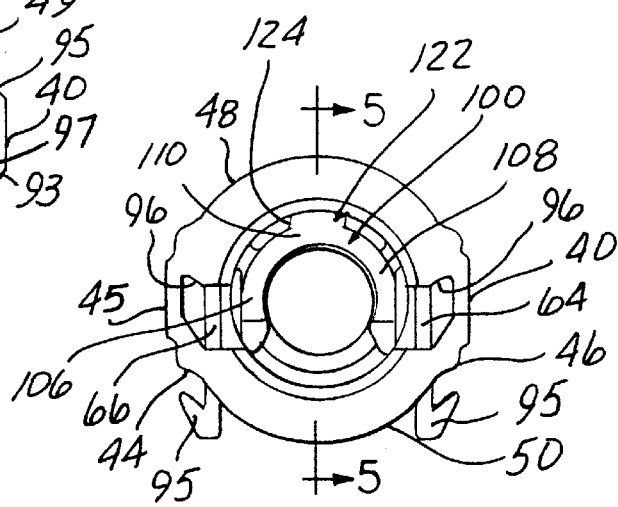
FIG. 4 is an end view of the quick connector, snap-on retainer and after incident indicator clip, with the retainer depicted in a fully inserted, position in the female component.

As shown in FIGS. 1, 3 and 4, the first end 24 of the housing 12 is formed with a pair of opposed, exterior flats 40 and 45. The flats 40 and 45 are diametrically opposed on the first end 24 and may be centrally located on each diametrical side of the first end 24. The adjacent surfaces of the housing 20 form an opposed pair of lock surfaces or flats, such as a first flat 44 and a second flat 46. A second pair of flats 47 and 49 are formed on the other side of the flats 44 and 46. The flats 44 and 46 extend axially a short distance along the first end 24 of the housing 20. The opposed surfaces 48 and 50 of the first end 24 of the housing 20 between the flats 44 and 46 and the flats 47 and 49 have a generally arcuate shape as shown in FIGS. 3 and 4. Apertures 49 and 51 are formed respectively in each surface 48 and 50. The apertures 49 and 51 are aligned to form a transverse bore extending through the first end 24 of the housing 20 which is disposed in communication with the first bore portion 21 in the housing 20.

The retainer 10, shown in FIGS. 1–5 is formed of a one-piece body of a suitable plastic, such as polyketone, for example, and has an end wall 62 formed of a generally curved or arcuate shape, by way of example only, and first and second spaced side legs 64 and 66. The side legs 64 and 66 extend generally parallel to each other from opposite ends of the end wall 62. Further, each side leg 64 and 66 has an outer end 72, although it is possible to connect the side legs 64 and 66 at a lower portion by an arcuate member.

A pair of projections 70 extend along the length of the retainer 60 between opposed side edges of the side legs 64 and 66, respectively. The projections 70 are located adjacent the outer end 72 of each leg 64. The projections 70 engage surfaces on the housing 12 to position the retainer 10 in the shipping position shown in FIG. 3, or in the fully inserted, latched position shown in FIGS. 4 and 5.

Further, a pair of outward extending lock tabs or edges 74 are formed adjacent the end wall 62 on each side leg 64 and 66. The lock tabs 74 engage notches 76 in the first end 24 of the housing 12 when the retainer 10 is fully inserted in the housing 12. The lock tabs 74 are offset from the center of the length of each of the side legs 64 and 66 so as to be located generally closer to one side end of the retainer 10 than the opposed side end. Similarly, the notches 76 are formed in the housing 12 closer to the first end 24 of the housing 12. This provides a visual indication of a proper orientation of the retainer 10 in the housing 12 to insure that the retainer 10 is correctly positioned to lock the male component 14 in the housing 12.

Figure 2:
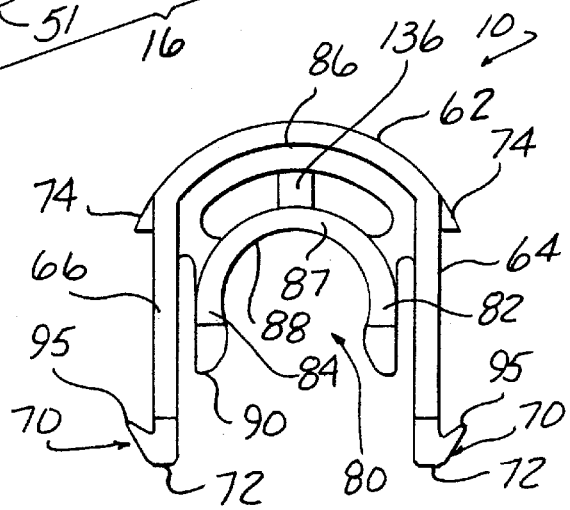
FIG. 2 is an end, elevation view of the snap-on retainer and after incident clip shown in FIG. 1.

As shown in FIGS. 1 and 2, the retainer 10 includes a radially flange receiving means 80 which is preferably carried as an integral, one-piece part of the retainer 10. The radial flange receiving means 80 includes first and second depending arms 82 and 84 which extend from a boss or enlargement 86 integrally formed on the inner surface of the end wall 62 of the retainer 10. An inverted, U-shaped slot 88 is formed on the inner surfaces of the arms 82 and 84 and a connecting piece 87 which is sized to snugly conform to the outer diameter of the tubular portion 41 of the male component 14. The outer ends 90 of each of the arms 82 and 84 are angled or tapered to act as a guide surface to assist in sliding movement of the arms 82 and 84 over the tubular end 41 of the male component 14. A boss or post 136 extends between the connecting piece 87 and the boss 86.

As shown in FIGS. 1 and 2, each of the arms 82 and 84 extends from one side end contiguous with a first side end 90 of the retainer 10 to an opposed side end which is spaced from a second side end 92 of the retainer 10.

This forms a slot or recess 94 within the interior of the legs 64 and 66 of the retainer 10 and the end of the arms 82 and 84. The recess 94, as shown in FIG. 5, is positioned to receive the annular flange 42 on the male component 14 only when the male component 14 is fully inserted into the female component or housing 12. This insures a fully seated, sealed connection between the male component 14 and the female component 12 while completely locking the male component 14 in the housing 12.

As shown in FIGS. 1 and 2, the projections 70 on the legs 64 and 66 of the retainer 10 are uniquely formed with an angled hook-like shape terminating in a tip 95. The tip 95 is disposed at an acute, upturned angle with respect to the corresponding legs 64 or 66.

Similarly, as shown in FIGS. 3 and 4, axial grooves 97 in the sides of the housing 12 are formed with a recess or notch 96 at one end which is shaped complementory to the shape of the tip 95 of the projection 70 on each of the legs 64 and 66 of the retainer 10. In this manner, pull out of the retainer 10 from the housing 12 is resisted by the interlocking tips 95 on the legs 64 and 66 of the retainer 10 which are seated within the notches 96 in the grooves 70 in the housing 12 as shown in the partially inserted position of the retainer 10 in FIG. 3. It should be noted that the outer surface of the housing 12 adjacent the first end 24 is formed with a pair of flats 44 and 46 which are disposed at an angle complementary to the acute angle of the tips 95 on the legs 64 and 66 of the retainer 10. This interlock of the tips 95 with the flats 44 and 46 resists pull out of the retainer 10 from the housing 12.

The hook shaped tips 95 on the legs 64 and 66 of the retainer 10 in conjunction with the grooves 97 in the housing 12 also provide, a distinct, "avalanche effect" snap action of the retainer 10 in the housing 12. The grooves 97 in the housing 12 are formed in generally planar side surfaces of the housing 12. The flat surfaces the ends 72 of the legs 64 and 66 laterally inward toward each other when the retainer 10 is inserted into the housing 12. When the tips 95 clear one edge of the grooves 97, the resilient nature of the legs 64 and 66 snaps the ends 72 and tips 95 laterally outward to create an "avalanche effect" which provides a distinct tactile feedback to the user indicating that the retainer has lockingly engaged the housing 12 in either the partially inserted position shown in FIG. 3 or the fully inserted position shown in FIG. 4. It should be noted that further insertion force on the retainer 10 moving the retainer 10 from the partially inserted position shown in FIG. 3 to the fully inserted position shown in FIG. 4 again causes the end 72 of the legs 64 and 66 to be urged laterally inward when the tips 95 of the legs 64 and 66 slide along the lower portion of the flat surfaces. When the tips 95 clear the outer ends of the flat surfaces, the legs 64 and 66 spring laterally outward in a distinct "avalanche effect" manner. The lower ends of the grooves 97 are angled inward to enable the tips 95 to slide out of the grooves 40 and 42.

The retainer 10 can be first be installed on the housing 12 in a shipping or storage position as shown in FIG. 3. In this position, the projections 95 on the side legs 64 and 66 of the retainer 10 snap into and engage the longitudinally extending grooves 97.

Further insertion of the retainer 10 through the aligned apertures 49 and 51 in the housing 12 causes the ends 72 of the legs 64 and 66 to pass along the lower portion of the side surfaces in the housing 12 until the tips 95 clear the ends of the side surfaces and then snap outward exteriorly of the outer surface of the first end 24 of the housing 12 as shown in FIG. 4. In this fully inserted position of the male component 14 in the female component 12, the annular flange 42 on the male component 14 is situated ahead the legs 64 and 66 on the retainer 10. This position represents the fully latched position in which the male component 14 is fully seated in and lockingly engaged with the female component 12. The full insertion of the retainer 10 into the housing 12 also provides visible indication of the fully locked connection of the male and female components 14 and 12, respectively.

It should be noted that if the male component 14 is not fully engaged or seated within the housing 12, the annular flange 42 on the male component 14 will not be properly situated within the transverse bore in the housing 12 to slidably receive the recess 94 in the retainer 10. If the annular flange 42 on the male component 14 is at any position other than shown in phantom in FIG. 5, the arms 82 and 84 on the retainer 10 will contact the annular flange 42. Since the spacing between the inner surfaces of the legs 82 and 84 is less than the outer diameter of the annular flange 42, the retainer 10 cannot be moved to the fully inserted position thereby providing an indication of an incomplete seating or mounting of the tip 43 of the male component 14 in the housing 12.

Figure 6:
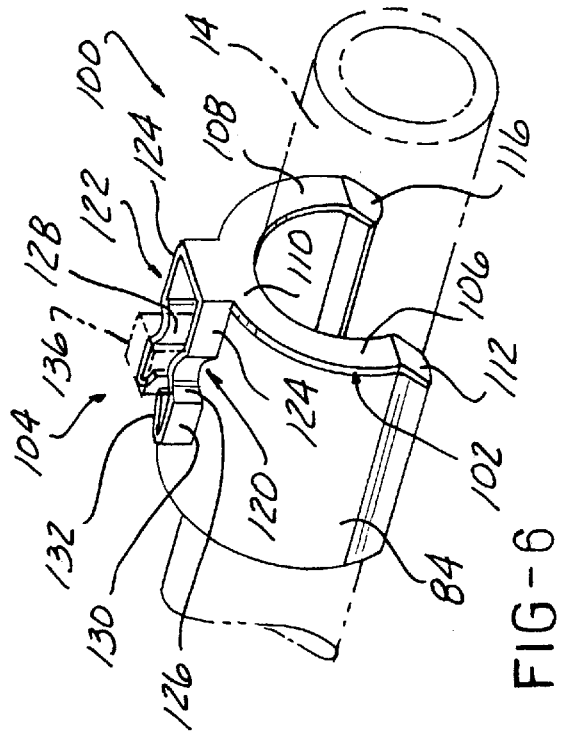
FIG. 6 is an enlarged perspective view of the after incident indicator clip of the present invention shown in a mounting position with the male tube and interconnecting portions of the female housing depicted in phantom.
Figure 7:
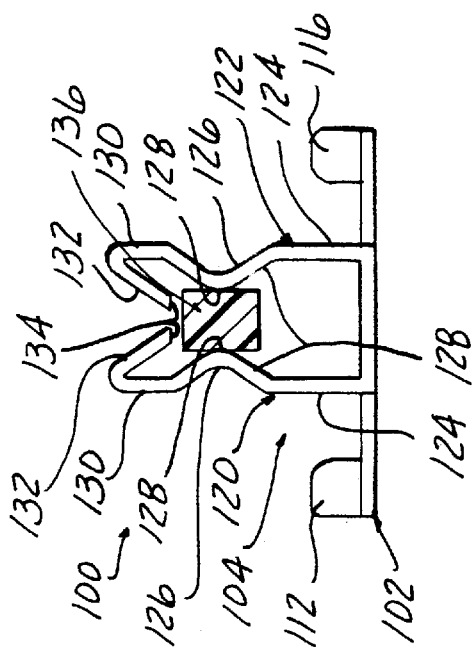
FIG. 7 is a plan view of the after incident clip shown in FIG. 6.

As shown in detail in FIGS. 6 and 7, an after incident clip 100 is mounted about the male component 14 so as to remain in position even after a thermal incident, such as fire, has consumed and/or destroyed all or a substantial portion of the quick connector.

The after incident clip 100 is preferably constructed of a high temperature resistant material. Steel is preferably employed for the after incident clip 100; although other high temperature resistant materials may also be employed.

The after incident clip 100, hereafter referred to simply as the clip 100, is formed of a one-piece body having a male component mounting portion 102 and a retainer mounting portion 104. The male component mounting portion 102 is formed of two spaced legs 106 and 108 which are interconnected at one end by a central end wall 110. The first and second legs 106 and 108 and the end wall 110 lie in a common plane. The opposed free ends 112 and 116 of the first and second legs 106 and 108, respectively, are preferably bent at an angle, such as a 45°, angle to conform to the inward angled lower ends of the side legs 64 and 66 of the retainer 10.

The retainer mounting portion 104 includes two spaced arms 120 and 122, respectively. The arms 120 and 122 are bent or extend from the plane of the male component mounting portion 102 and are angularly disposed, such as 10 perpendicularly, from the plane of the first and second legs 106 and 108 and the end wall 110 of the male component mounting portion 102. Each of the arms 120 and 122 is identically constructed, but are disposed in 180° opposed orientation from each other so as to form a pair of opposed arms as shown in FIGS. 6 and 7.

By example, the arm 120 has a first, substantially linear portion 124 extending from the end wall 110, an inward angled notch 126 forming an inner surface 128, and a second linear portion 130 generally coplanar with the first portion 124. An outer end of the second portion 130 is bent inward to form an inward extending flange 132.

The opposed arm 122 is also formed with a first portion 124 extending from the end wall 110, a notch 126 forming an inner surface 128, a second linear portion 130 and an inward angled flange 132 which is spaced from the opposed flange 132 of the arm 120.

Further, the inner ends 134 of each of the inward angled flanges 132 of the arms 120 and 122 are generally aligned, but are spaced from the opposed and also aligned surfaces 128 formed by the notches 126. This forms an opening into which the post or boss 136 on the retainer 10 fits. As shown in FIG. 5, the centering piece or post 136 has a generally rectangular cross section and extends centrally between the boss 86 and the connecting piece 87.

In use, prior to insertion of the retainer 10 into the female component 12, the after incident clip 100 is connected to the retainer 10 by slidably urging the cantilevered arms 120 and 122 past the post 136 on the retainer 10. During such insertion, the inward angled ends 132 of the arms 120 and 122 expand outward allowing the post 136 to pass therethrough. Once the ends 134 slide past the post 136, the end 134 of each arm 132 snaps inward to a spacing less than the width of the post 136.

As shown in FIGS. 5 and 6, the post 136 is held in position between the ends 134 of the arms 132 and the inner surfaces 128 of the notches 126 to securely mount the clip 100 to the retainer 10.

The retainer 10 may then be inserted into the female component 12 in the normal manner described above to lockingly interconnect the female component 12 and the male component 14 only when the male component 14 is fully inserted into a sealed position in the female component 12. In this position, the legs 106 and 108 of the after incident clip 100, which conform to the shape of the side legs 64 and 66 of the retainer 10, are disposed about the male component 14 but do not interferingly contact the male component 14 so as to change the insertion or pullout force characteristics of the quick connector.

In the event of a thermal incident, typically involving fire and the resulting high temperatures associated therewith, it is common for the retainer 10 and the female component 12, which are both typically formed of plastic, to melt or otherwise be partially or substantially destroyed or at least deformed into a solid mass of solidified plastic after cooling. However, such deformation or melting of the plastic retainer 10 and female component 12 will not effect the after incident clip 100 which is formed of a high temperature resistant material, such as a metal and, preferably, steel. The clip 100 will remain on the male component 14 in the same position it occupied when the retainer 10 was inserted through the apertures in the female component 12 to lockingly interconnect the male component 14 to female component 12. In this manner, regardless of the amount of deformation of the female component 12 and the retainer 10, the after incident clip 100 is capable of providing an indication of the position of the retainer 10 relative to the female component 12 and the male component 14 as well as the position of the female component 12 relative the male component 14 before and/or during the thermal incident.

In summary, there has been disclosed a unique after incident clip for use in a quick connector having a retainer element which provides a visual indication of the lockingly interconnected or disconnected position of the female and male components of the quick connector after a thermal incident. The after incident clip is of simple construction and does not require significant modification to the existing quick connector and retainer designs. This enables the after incident clip to be easily integrated into existing quick connector designs without significant additional modification.

What is claimed is:

1. An after incident clip and quick connector combination comprising:
    a quick connector formed of mating male and female components in which the male component has a radially enlarged annular flange spaced from a tip end which is insertable into a bore in the female component, and a retainer element slidable through a transverse bore in the female component into engagement with the male component only when the male component is fully inserted into the bore in the female component, the female component and the retainer element formed of plastic material; and
    an after incident clip including:
        a body separate from the retainer element and formed of a high temperature resistant material having a melting point substantially higher than a melting point of the female component and a melting point of the retainer element so as to remain substantially intact and in a mounting position relative to the retainer element of the quick connector after a thermal incident;
        means for mounting the body about the male component; and
        means, carried on the body, for releasably engaging the retainer element.

2. The after incident clip and quick connector combination of claim 1 wherein the body is formed of metal.

3. The after incident clip and quick connector combination of claim 1 wherein the means for mounting the body about the male component comprises:
    first and second spaced legs interconnected at one end by an end wall, the first and second legs spaced at a distance at least as large as the diameter of the male component.

4. The after incident clip and quick connector combination of claim 3, wherein the means for releasably engaging the retainer element comprise:
    a pair of spaced arms extending from the body and having opposed, freely movable ends.

5. The after incident clip and quick connector combination of claim 4 wherein the first and second arms, the end wall and the first and second legs are unitarily formed as a one-piece member.

6. The after incident clip and quick connector combination of claim 1 wherein the means for releasibly engaging the retainer element comprises:
    first and second arms cantileverily extending from the means for mounting the body about the male component.

7. The after incident clip and quick connector combination of claim 1 wherein the means for mounting the body about the male component comprise:
    first and second spaced legs interconnected on one and by an end wall;
    opposed ends of each of the first and second legs extending out of a common plane formed by each of the first and second legs.

8. The after incident clip and quick connector combination of claim 7 further comprising:
    a recess formed in one end wall of the retainer element for receiving the first and second legs and the end wall of the after incident clip.

9. An after incident clip and quick connector combination in which the quick connector is formed of mating male and female components in which the male component has a radially enlarged annular flange spaced from a tip end which is insertable into a bore in the female component, and a retainer element slidable through a transverse bore in the female component into engagement with the male component only when the male component is fully inserted into the bore in the female component; and
    the after incident clip includes:
        a body formed of a high temperature resistant material;
        means for mounting the body about the male component; and
        means, carried on the body, for releasibly engaging the retainer element, the means for releasibly engaging the retainer element including first and second arms cantileverily extending from the means for mounting the body about the male component;
        each of the first and second arms having an inwardly extending end spaced from the inward extending end of the opposite first and second arm, the inward extending end being expandable when the after incident clip is inserted into the retainer element and snap past a central post in the retainer element to lockingly engage the after incident clip with the retainer element.

10. The after incident clip and quick connector combination of claim 9 further comprising:
    an indent surface formed on at least one of the first and second arms spaced between the inwardly extending ends of the first and second arms and the means for mounting the body about the male component, the indent surface cooperating with the inwardly extending ends of the first and second arms to lockingly trap a central post of the retainer element.

11. A quick connector comprising:
    mating male and female components;
    the male component having a first end portion terminating in a tip end and a radial enlargement spaced from the tip end;
    the female component including a housing having a through bore formed of at least a first axially extending bore portion disposed adjacent to an open first end of the housing for receiving the male component therein;
    a transverse bore formed in the housing in communication with the first bore portion in the housing;

retainer means, slidable through the transverse bore in the housing, for releasably locking the male and the female component together, the retainer means including:

a body having an end wall and first and second spaced legs extending from the end wall, each of the first and second legs having opposed first and second side edges;

first and second arms formed on the body interiorly of the first and second legs, respectively, the first and second arms spaced apart a distance less than an outer diameter of the radial enlargement of the male component;

the first and second arms extending between the first and second side edges of the body for a distance less than a length of the first and second legs between the first and second side edges of the body to form a recess interiorly of the first and second legs for receiving the radial enlargement on the male component only when the male component is fully inserted within the female component; and outward angled projections formed on the first and second legs releasably engagable with an outer surface of the housing after the retainer means is fully inserted into the transverse bore in the housing and the ends of the legs projecting outward from the transverse bore in the housing; and an after incident clip mountable on the body of the retainer means and disposable about the male component when the retainer means is mounted in the female component releasibly locking the male component and the female component, the after incident clip including
a body formed of a high temperature resistant material having a melting point substantially higher than a melting point of the female component and the retainer means to remain substantially intact and in a mounting position relative to the male component after a thermal incident.

12. The quick connector of claim 11, wherein the after incident clip comprises:

means for mounting the body of the after incident clip about the male component; and means, carried on the body of the after incident clip, for releasably engaging the retainer means.

13. The quick connector of claim 12 wherein the body of the after incident clip is formed of metal.

14. The quick connector of claim 12 wherein the means for releasably engaging the retainer means comprises:

first and second arms cantilevered from the means for mounting the body of the after incident clip about the male component.

15. A quick connector comprising:

mating male and female components;

the male component having a first end portion terminating in a tip end and a radial enlargement spaced from the tip end;

the female component including a housing having a through bore formed of at least a first axially extending bore portion disposed adjacent to an open first end of the housing for receiving the male component therein;

a transverse bore formed in the housing in communication with the first bore portion in the housing;

retainer means, slidable through the transverse bore in the housing, for releasably locking the male component and the female component together, the retainer means including:

a body having an end wall and first and second spaced legs extending from the end wall, each of the first and second legs having opposed first and second side edges;

first and second arms formed on the body interiorly of the first and second legs, respectively, the first and second arms spaced apart a distance less than an outer diameter of the radial enlargement of the male component;

the first and second arms extending between the first and second side edges of the body for a distance less than a length of the first and second legs between the first and second side edges of the body to form a recess interiorly of the first and second legs for receiving the radial enlargement on the male component only when the male component is fully inserted within the female component; and outward angled projections formed on the first and second legs releasably engageable with an outer surface of the housing after the retainer means is fully inserted into the transverse bore in the housing and the ends of the legs projecting outward from the transverse bore in the housing; and an after incident clip mountable on the body of the retainer means and disposable about the male component when the retainer means is mounted in the female component releasably locking the male component and the female component, the after incident clip including:

a body formed of a high temperature resistant material;

means for mounting the body about the male component including first and second spaced legs interconnected at one end by an end wall, the first and second legs spaced at a distance at least as large as the diameter of the male component; and means, carried on the body of the after incident clip, for releasably engaging the retainer means.

16. The quick connector of claim 15 wherein the means for releasably engaging the retainer means comprises:

a pair of spaced arms extending from the body of the after incident clip and having opposed, freely movable ends.

17. The quick connector of claim 16 wherein the first and second arms, the end wall and the first and second legs are unitarily formed as a one-piece member.

18. A quick connector comprising:

mating male and female components;

the male component having a first end portion terminating in a tip end and a radial enlargement spaced from the tip end;

the female component including a housing having a through bore formed of at least a first axially extending bore portion disposed adjacent to an open first end of the housing for receiving the male component therein;

a transverse bore formed in the housing in communication with the first bore portion in the housing;

retainer means, slidable through the transverse bore in the housing, for releasably locking the male component and the female component together, the retainer means including;

a body having an end wall and first and second spaced legs extending from the end wall, each of the first and second legs having opposed first and second side edges;

first and second arms formed on the body interiorly of the first and second legs, respectively, the first and second arms spaced apart a distance less than an outer diameter of the radial enlargement of the male component;

the first and second arms extending between the first and second side edges of the body for a distance less than a length of the first and second legs between the first and second side edges of the body to form a recess interiorly of the first and second legs for receiving the radial enlargement on the male component only when the male component is fully inserted within the female component; and outward angled projections formed on the first and second legs releasibly engageable with an outer surface of the housing after the retainer means is fully inserted into the transverse bore in the housing and the ends of the legs projecting outward from the transverse bore in the housing; and an after incident clip mountable on the body of the retainer means and disposable about the male component when the retainer means is mounted in the female component releasibly locking the male component and the female component, the after incident clip including:

a body formed of a high temperature resistant material;

means for mounting the body about the male component; and means, carried on the body, for releasibly engaging the retainer means, the means for releasibly engaging the retainer means including first and second arms cantilevered from the means for mounting the body about the male component, the first and second arms have an inwardly extending end spaced from the inward extending end of the opposite first and second arm, the inward extending arms being expandable when the after incident clip is inserted into the retainer means and snap past a central post in an aperture in the retainer means to lockingly engage the after incident clip with the retainer means.

19. The quick connector of claim 18 further comprising:

an indent surface formed on at least one of the first and second arms spaced between the inwardly extending ends of the first and second arms and the means for mounting the body about the male component, the indent surface cooperating with the inwardly extending ends of the first and second arms to lockingly trap a central post of the retainer means.

20. A quick connector comprising:

mating male and female components;

the male component having a first end portion terminating in a tip end and a radial enlargement spaced from the tip end;

the female component including a housing having a through bore formed of at least a first axially extending bore portion disposed adjacent to an open first end of the housing for receiving the male a component therein;

a transverse bore formed in the housing in communication with the first bore portion in the housing;

retainer means, slidable through the transverse bore in the housing, for releasibly locking the male component and the female component together, the retainer means including:

a body having an and wall and first and second spaced legs extending from the end wall, each of the first and second legs having opposed first and second side edges;

first and second arms formed on the body interiorly of the first and second legs, respectively, the first and second arms spaced apart a distance less than an outer diameter of the radial enlargement of the male component;

the first and second arms extending between the first and second side edges of the body for a distance less than a length of the first and second legs between the first and second side edges of the body to form a recess interiorly of the first and second le s for receiving the radial enlargement on the male only when the male component is fully inserted within the female component; and outward angled projections formed on the first and second legs releasibly engageable with an outer surface of the housing after the retainer means is fully inserted into the transverse bore in the housing and the ends of the legs projecting outward from the transverse bore in the housing; and an after incident clip mountable on the body of the retainer means and disposable about the male component when the retainer means is mounted in the female component releasibly locking the male component and the female component, the after incident clip including means for engaging the male component formed of first and second spaced legs interconnected on one end by an end wall; and opposed ends of each of the first and second legs extending out of a common plane formed by each of the first and second legs.

21. The quick connector of claim 20 further comprising:

a recess formed in one end wall of the retainer means for receiving the first and second legs and the end wall of the after incident clip.

* * * * *